(12) United States Patent
Langenfeld et al.

(10) Patent No.: US 8,991,490 B2
(45) Date of Patent: Mar. 31, 2015

(54) TAPERED THREAD CONFIGURATION WITH IMPROVED DURABILITY

(75) Inventors: Michael D. Langenfeld, Pella, IA (US); Randy R. Runquist, Knoxville, IA (US)

(73) Assignee: Vermeer Manufacturing Company, Pella, IA (US)

( * ) Notice: Subject to any disclaimer, the term of this patent is extended or adjusted under 35 U.S.C. 154(b) by 269 days.

(21) Appl. No.: 13/380,168

(22) PCT Filed: Nov. 29, 2011

(86) PCT No.: PCT/US2011/062356
§ 371 (c)(1),
(2), (4) Date: Jun. 26, 2012

(87) PCT Pub. No.: WO2012/074984
PCT Pub. Date: Jun. 7, 2012

(65) Prior Publication Data
US 2012/0267170 A1    Oct. 25, 2012

Related U.S. Application Data

(60) Provisional application No. 61/435,689, filed on Jan. 24, 2011, provisional application No. 61/418,783, filed on Dec. 1, 2010.

(51) Int. Cl.
*E21B 17/00* (2006.01)
*E21B 17/042* (2006.01)
*E21B 17/03* (2006.01)

(52) U.S. Cl.
CPC ............... *E21B 17/042* (2013.01); *E21B 17/03* (2013.01)
USPC .......... 166/242.6; 285/383; 411/285; 403/299

(58) Field of Classification Search
CPC ...... E21B 17/042; E21B 17/03; E21B 17/046
USPC ......... 166/242.6; 175/325.2, 57; 285/2, 4, 81, 285/92, 333, 383; 411/285, 929; 464/18, 464/140, 45, 183, 902; 403/299
See application file for complete search history.

(56) References Cited

U.S. PATENT DOCUMENTS

| 603,004 | A | * | 4/1898 | Schock et al. | ............. 128/109.1 |
| 3,822,902 | A | * | 7/1974 | Maurer et al. | ................... 285/94 |
| 3,869,150 | A | * | 3/1975 | Brown | ............................ 285/13 |

(Continued)

FOREIGN PATENT DOCUMENTS

WO    WO 2008/057145 A2    5/2008

OTHER PUBLICATIONS

International Search Report and Written Opinion mailed Jul. 27, 2012.

(Continued)

*Primary Examiner* — Yong-Suk (Philip) Ro
(74) *Attorney, Agent, or Firm* — Merchant & Gould P.C.

(57) ABSTRACT

Underground drilling operation often requires connecting a drill tool (e.g., drill bit, backreamer, etc.) to a drill string. It is desirable to connect the drill tools to a drill string in a manner that facilitates quick and easy assembly and disassembly. Low torque coupling, commonly referred to as "torque-less" connection, can provide such functionality. The useful life and strength of such connections can be improved upon. The present disclosure provides a low torque coupling with improved strength and durability.

27 Claims, 9 Drawing Sheets

(56) References Cited

U.S. PATENT DOCUMENTS

| | | | |
|---|---|---|---|
| 4,658,915 A * | 4/1987 | Goris et al. | 175/57 |
| 4,892,337 A | 1/1990 | Gunderson et al. | |
| 5,505,502 A | 4/1996 | Smith et al. | |
| 5,681,059 A | 10/1997 | Mackie | |
| 6,254,146 B1 | 7/2001 | Church | |
| 6,406,070 B1 | 6/2002 | DeLange et al. | |
| 6,860,514 B2 | 3/2005 | Wentworth et al. | |
| 7,661,727 B2 | 2/2010 | Roussie et al. | |
| 8,225,885 B2 | 7/2012 | Wentworth et al. | |
| 2005/0189147 A1 | 9/2005 | Williamson et al. | |
| 2005/0224259 A1 | 10/2005 | Bise et al. | |
| 2006/0078372 A1 | 4/2006 | Kanflod et al. | |
| 2007/0074868 A1 * | 4/2007 | Slack et al. | 166/242.1 |
| 2010/0171305 A1 | 7/2010 | Roussie et al. | |
| 2010/0308577 A1 * | 12/2010 | Chin | 285/333 |

OTHER PUBLICATIONS

Railhead Underground Products, LLC, Railhead Quick Connect Features, 2 pages, website printout (2006).

Ballantine, Inc. HDD Downhole Tool & Accessories copyright date of 2006; 56 pages.

Third Party Oct. 30, 2014 cover letter enclosing David Helgeson's Oct. 21, 2014 declaration with exhibits and Claim Chart; 2 pages.

Third Party Claim Chart with annotated figures: enclosure from Third Party Oct. 30, 2014 letter; 11 pages.

Helgeson, David; Declaration dated Oct. 21, 2014; 85 pages.

The Railhead Catalog; undated; 74 pages: referenced as Exhibit A in David Helgeson's Oct. 21, 2014 Declaration wherein he alleges that the document was publicly available on or before Jan. 1, 2004.

Description of the Railhead Quick Connect System; web.archive.org; 2002; 2 pages: referenced as Exhibit B to David Helgeson's Oct. 21, 2014 Declaration wherein he alleges that the document was publicly available before Aug. 2002.

Description of the Railhead Quick Connect System; undated; 7 pages: referenced as Exhibit C to David Helgeson's Oct. 21, 2014 Declaration wherein he alleges that the document was publicly available before Aug. 2002.

Vermeer D16X20 Navigator Operator's Manual copyright date of 1996; 120 pages.

p. 35-10 excerpted from Vermeer D16X20 Navigator Operator's Manual copyright date of 1996; 3 pages.

* cited by examiner

TAPERED THREAD CONFIGURATION WITH IMPROVED DURABILITY

This application is a National Stage Application of PCT/US2011/062356, filed on on 29 Nov. 2011, which claims benefit of U.S. Provisional Patent Application Ser. No. 61/418,783, filed Dec. 1, 2010 and U.S. Provisional Patent Application Ser. No. 61/435,689, filed Jan. 24, 2011, and which applications are incorporated herein by reference. To the extent appropriate, a claim of priority is made to each of the above disclosed applications.

TECHNICAL FIELD

The present disclosure provides a coupling for connecting a drill tool to a drill string and related methods.

BACKGROUND

Underground drilling operation often requires connecting a drill tool (e.g., drill bit, backreamer, etc.) to a drill string. It is desirable to connect the drill tools to a drill string in a manner that facilitates quick and easy assembly and disassembly. Low torque coupling, commonly referred to as "torque-less" connection, can provide such functionality. The useful life and strength of such connections can be improved upon. The present disclosure provides a low torque coupling with improved strength and durability.

DETAILED DESCRIPTION

Figure 1:
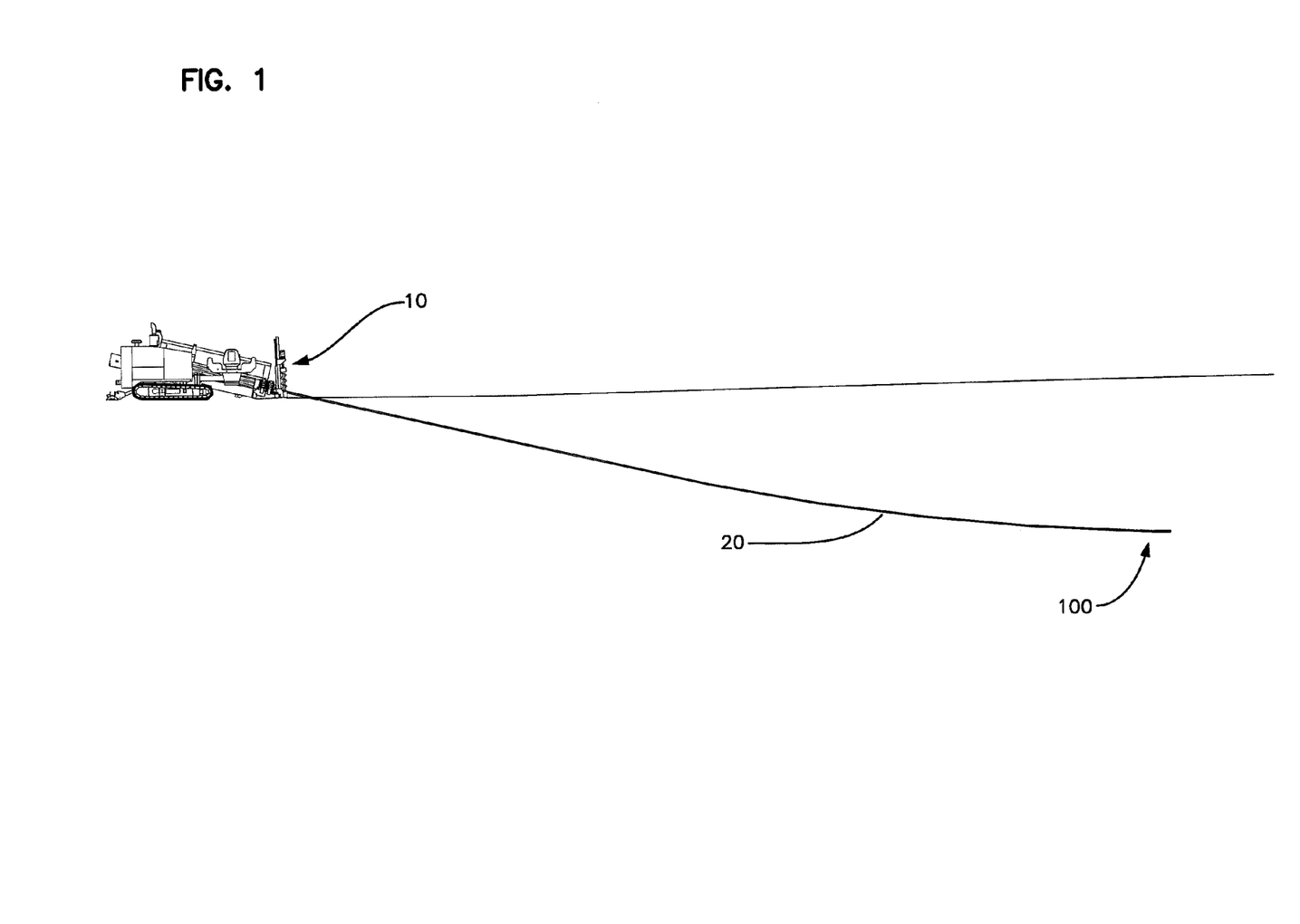
FIG. 1 is a schematic illustration of a drilling machine in operation.
Figure 2:
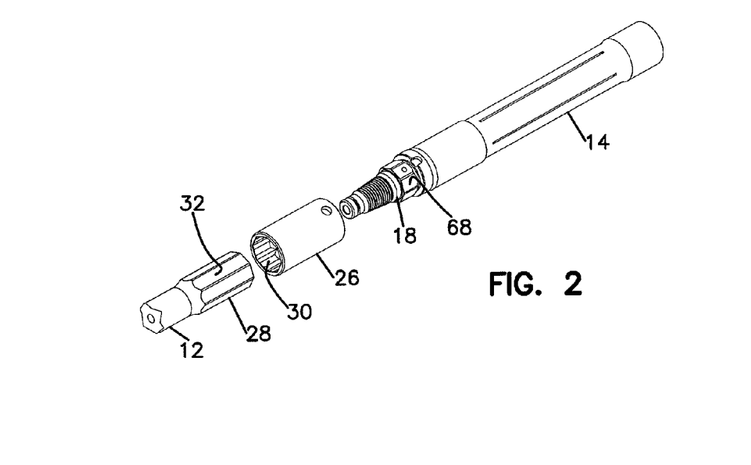
FIG. 2 is a perspective view of a coupling according to the principles of the present disclosure.
Figure 3:
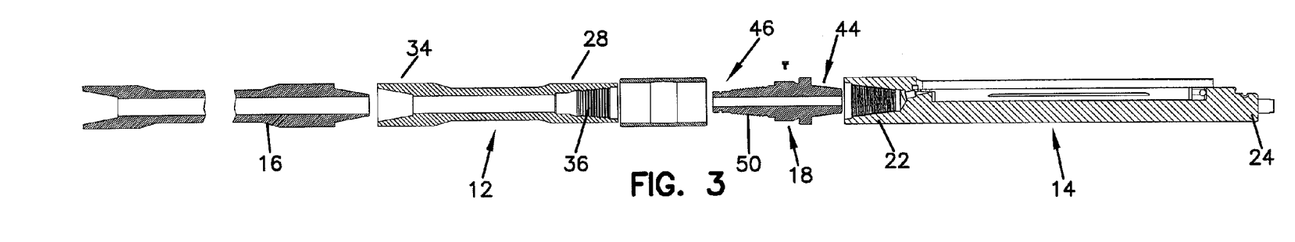
FIG. 3 is a cross-sectional view of a portion of the coupling of FIG. 2.
Figure 4:
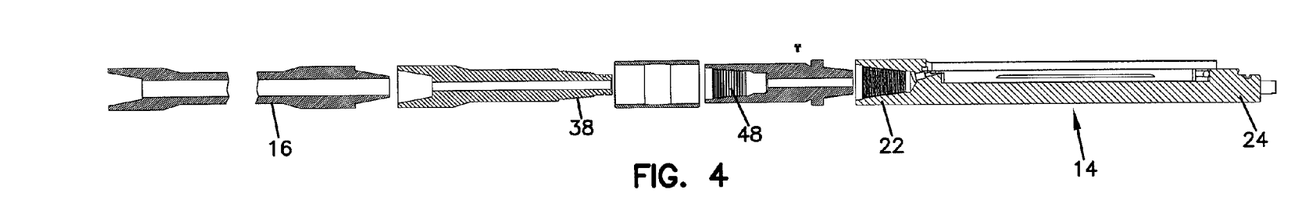
FIG. 4 is a cross-sectional view of an alternative embodiment of the coupling shown in FIG. 3.
Figure 5:
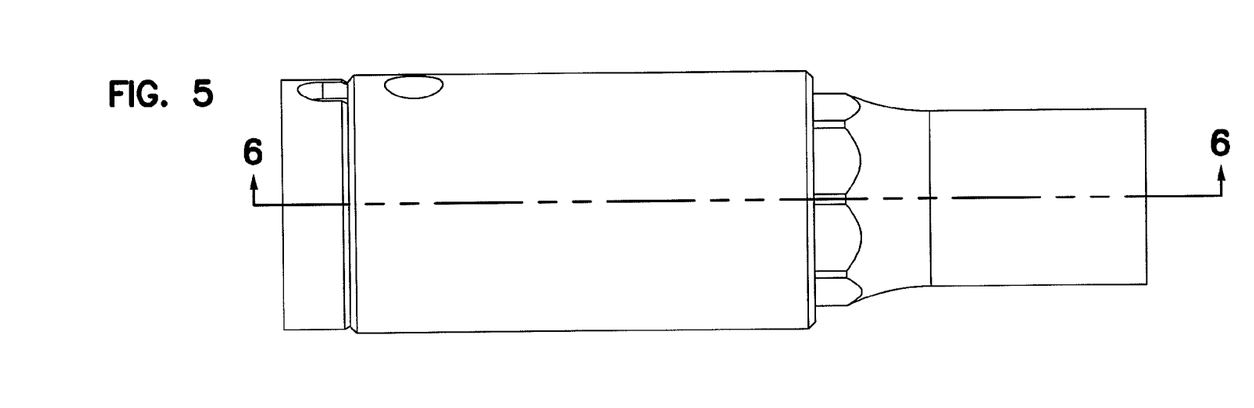
FIG. 5 is a side view of a portion of the coupling of FIG. 2 shown in a fully engaged position.

Referring to FIG. 1 a drilling machine 10 is shown driving a drill string 20 into the ground. The distal end of the drill string includes a drill tool assembly 100. The coupling between an end of the drill string 20 and the drill tool assembly 100 is shown in greater detail in FIGS. 2-9.

Referring generally to FIGS. 2-9, a coupling between a starter rod 12 and a sonde housing 14 is shown. The starter rod 12, also referred to as a pilot rod or generically a first member, is threadly connected to the distal most (down hole most) drill rod 16 via a torque connection. The sonde housing 14 is configured to house a sonde therein and supports a drill bit (not shown) at its distal end 24.

In the depicted embodiment an adaptor 18 is threadly connected in the proximal end 22 of the sonde housing 14 via a torque connection. The adaptor 18 and sonde 14 are also referred to herein generically as a second member. A collar 26 is provided to slide over a distal end 28 of the starter rod 12 and a portion of the adaptor 18 to prevent relative rotation between the starter rod and adaptor (and hence also prevent relative rotation between the starter rod 12 and the sonde housing 14).

In the depicted embodiment an inner surface of the collar 26 is configured to engage external structural features on the distal end 28 of the starter rod 12 and on the exterior surface of the adaptor 18. In the depicted embodiment the collar includes internal flats 30 that engage flats 32 on the distal end 28 of the starter rod 12 and flats 68 on the exterior of the adaptor 18. The connection between the distal end 28 of the starter rod 12 and the proximal end 36 of the adapter 18 is described in greater detail below.

In the depicted embodiment the coupling includes first member including a driving end and a driven end. In the depicted embodiment, the first member is shown as the starter rod 12. The drive end is shown as the distal end 28 and the driven end is shown as the proximal end 34. The proximal end 34 is threadly connected to the down hole most drill rod 16 via a torque connection.

In the depicted embodiment the driving end of a first member (e.g., the distal end 28 of the starter rod 12) includes a tapered portion (recess 36 shown in FIG. 3 or protrusion 38 shown in FIG. 4) including threads thereon. The driving end includes a first land 40 (FIG. 6) adjacent a distal end of the tapered portion (e.g., the protrusion 38 or recess 36) and a second land 42 (FIG. 6) adjacent a proximal end of the tapered portions (protrusion 38 or recess 36).

In the depicted embodiment the second member (adaptor 18) includes a drive end 44 and a driven end 46. The drive end 44 includes a threaded connection for attaching to a cutting tool (e.g., a sonde housing 14 supporting a drill bit). The driven end 46 is adapted for connection with the driving end 28 of the first member 12. The driven end 46 includes a tapered portion (e.g., recess 48 shown in FIG. 4 or protrusion 50 shown in FIG. 6) including threads thereon. The driven end 46 includes a third land portion 52 (FIG. 6) adjacent a distal end of the tapered portion (e.g., recess 48 or protrusion 50). The drive end 46 also includes a fourth land portion 54 adjacent a proximal end of the tapered portion.

Figure 6:
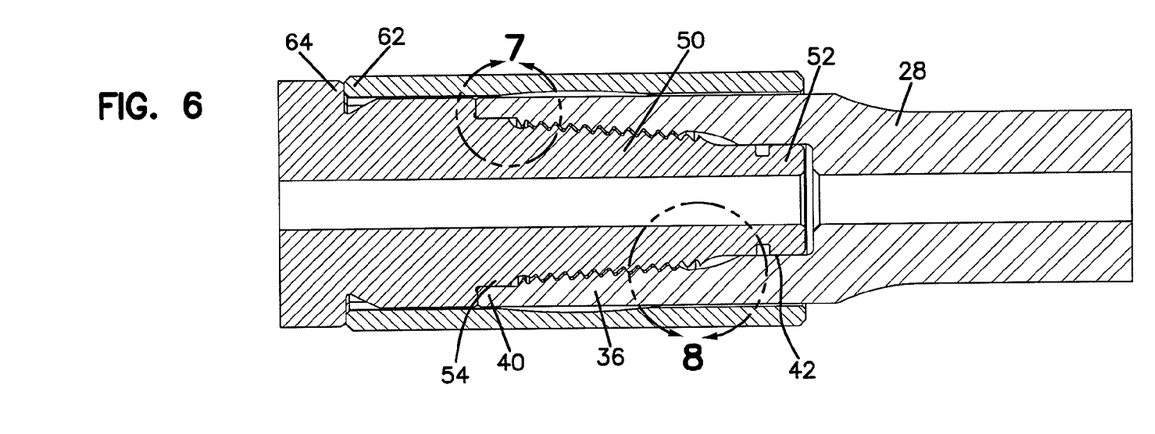
FIG. 6 is a cross-sectional view along line 6-6 of FIG. 5.
Figure 7:
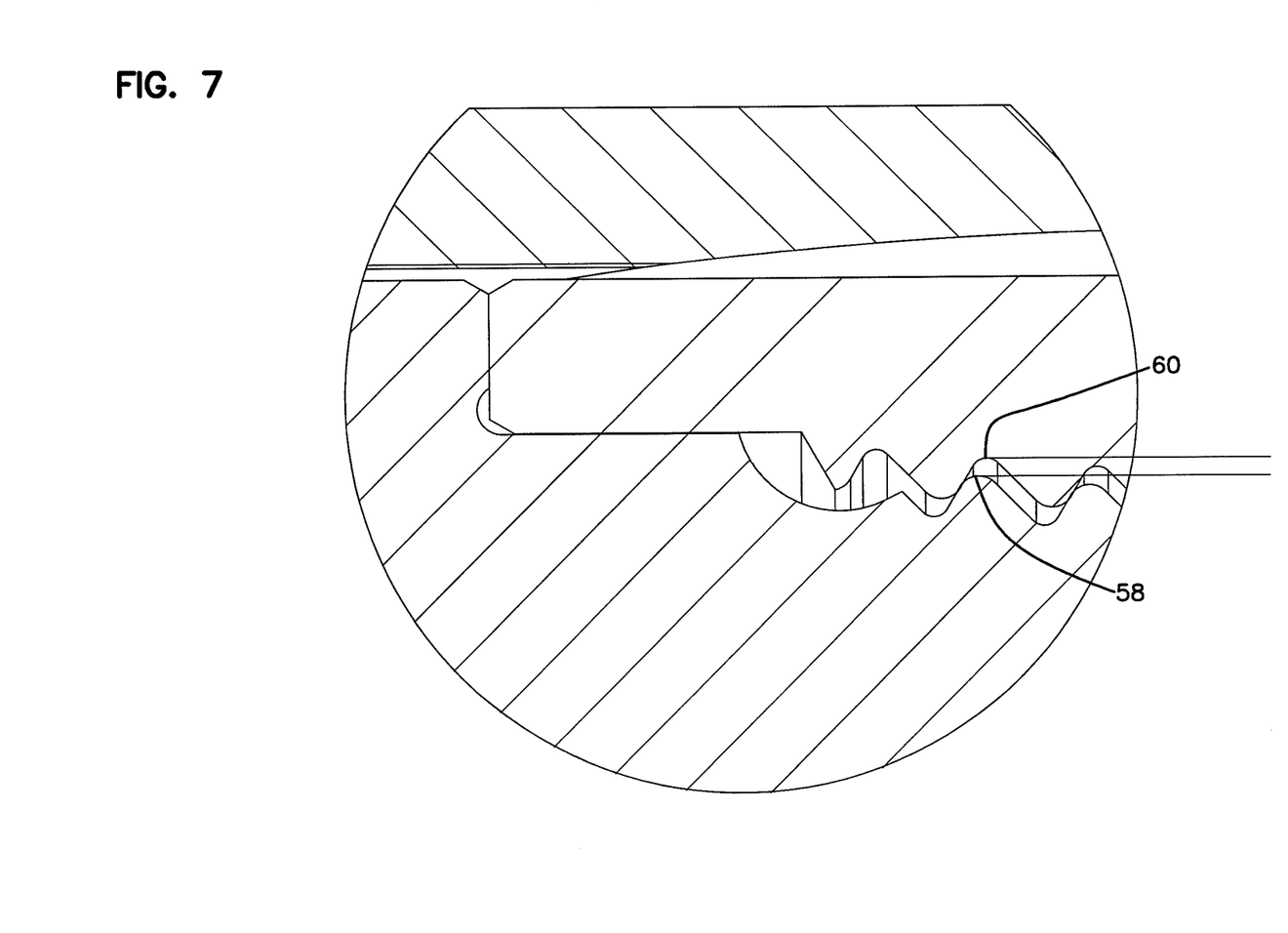
FIG. 7 is an enlarged view of a portion of FIG. 6 labeled 7.
Figure 8:
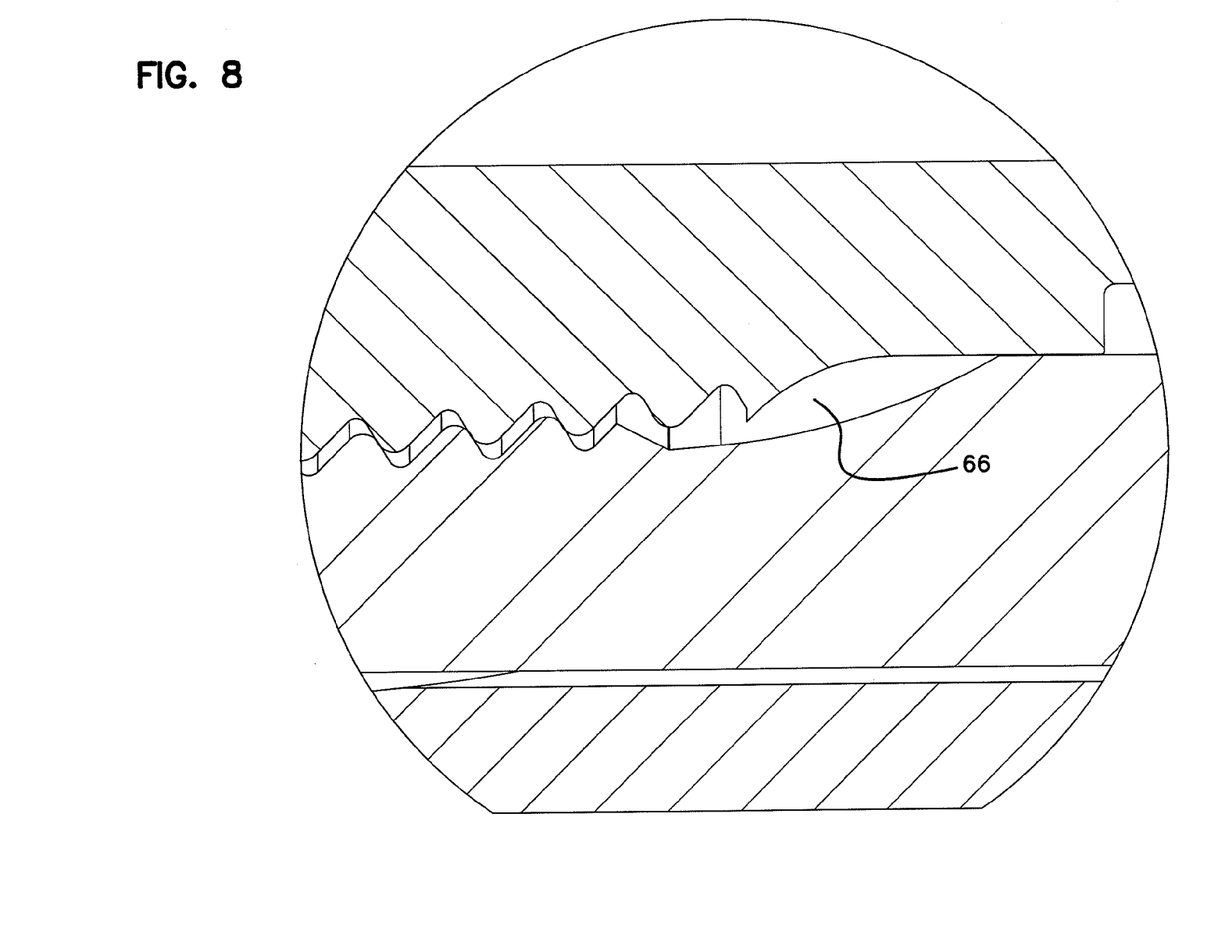
FIG. 8 is an enlarged view of a portion of FIG. 6 labeled 8.

In the depicted embodiment the first land 40 is configured to engage the fourth land 54 and the second land 42 is configured to engage the third land 52 when the tapered threads on the first member 28 are engaged with the tapered threads on the second member 18. In the depicted embodiment the clearance between the first land 40 and fourth land 54 and the clearance between the second land 42 and the third land 52 is sufficient to allow a user to slidably engage the first and second members by hand. In the depicted embodiment the first land and the fourth land are cylindrical having diameters that are at least 0.003 inches different from each other (for example, within 0.003 inches to 0.006 inches (0.076 to 0.150 millimeters) of each other). In other words, the clearance between the surfaces of the lands in a radial direction (radial clearance) is between 0.0015 to 0.003 inches (0.038 to 0.076 millimeters). It should be appreciated that in alternative embodiment the lands could be of different geometric configurations and have different clearance therebetween.

In some embodiment the peaks 58 of the threads on the tapered portion of second member and valleys 60 of the threads of the first member are offset by at least 0.030 inches (0.76 millimeters) even when the threads are engaged. In the depicted embodiment the pitch diameter between the threaded portions on the first and second members are offset by at least 0.030 inches. On a tapered thread like the ones shown the pitch diameter at a given position on the thread axis is the diameter of the pitch cone at that position. It should be appreciated that when the crest of the thread is truncated beyond the pitch line, the pitch diameter and pitch cylinder or pitch cone would be based on theoretical extension of the threaded flanks.

As discussed above, the second member is depicted as an adapter 18. However, it should be appreciated that in alternative embodiments the first member can be different components including, for example, a drill bit or a sonde housing.

Figure 9:
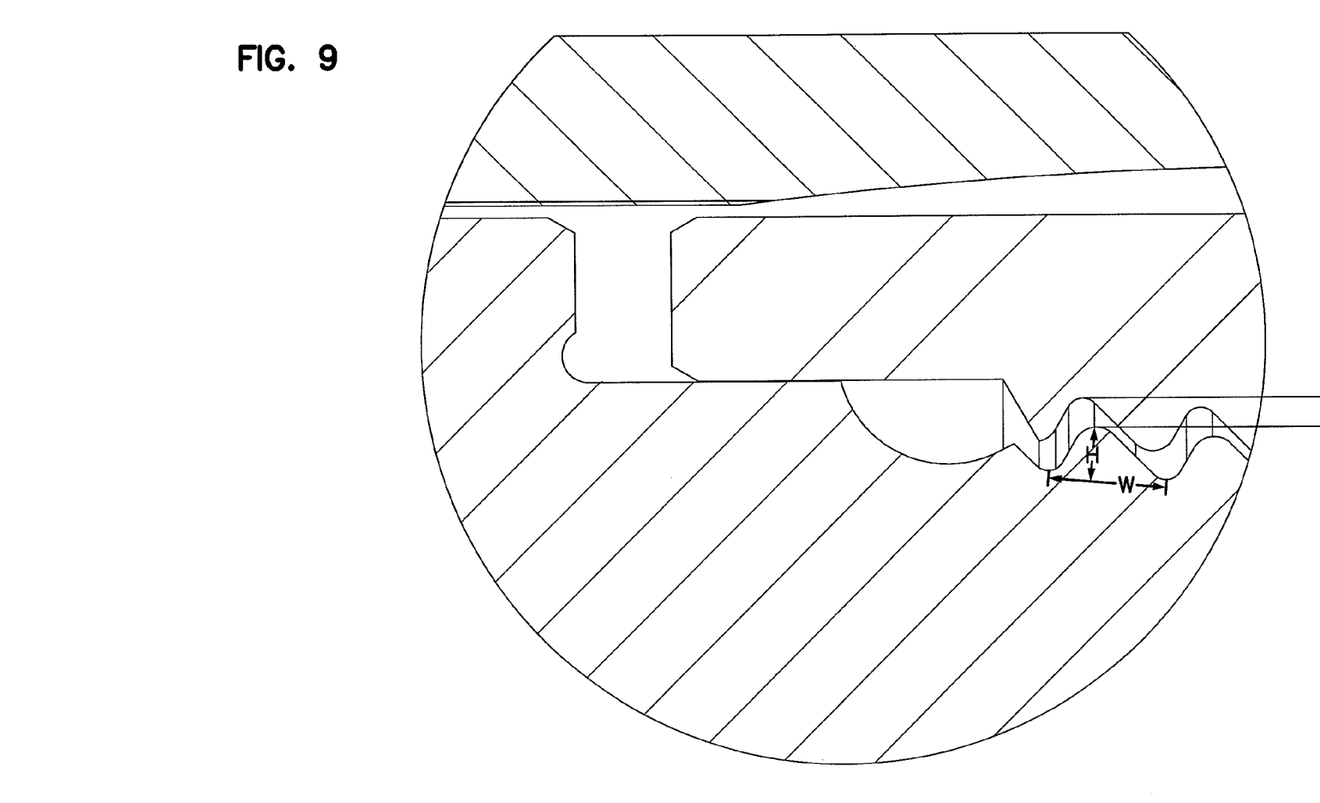
FIG. 9 is a view of the subject matter of FIG. 7 with the coupling shown in a partially engaged position.

In the depicted embodiment the threads on the tapered recess and threads of the tapered protrusions are asymmetric having a tooth width W to height H ratio between 1.25 to 3.0 (FIG. 9). The asymmetric short threads facilitate self-alignment alignment and maintain the above-described offset between peaks and valleys of corresponding threads.

In the depicted embodiment the first member 28 includes structure that abuts structure on the second member 18 to limit the offset between the peaks of the threads on the tapered recess and valleys of the threads of the tapered protrusions. The structure on the first member is shown as front face 62 and the structure on the second member is shown as an annular shoulder 64.

In the depicted embodiment, a portion 66 (FIG. 8) of the tapered recess at its distal end is enlarged and does not include threads thereon. In the depicted embodiment, a portion of the tapered recess at its proximal end is also enlarged (portion 67 of FIG. 7) and does not include threads thereon. These portions are configured to receive foreign matter (e.g., rock and dirt) and thereby prevent the matter from jamming the connection between the first and second members. In addition, these portions also act as stress relief zones that distribute load at the transition, thereby avoiding stress concentrations, which increases the durability of the coupling 18. In the depicted embodiment the enlarged portion comprises an annular notch that is part of the tapered recess. It should be appreciated that in alternative embodiments the enlarged portion (e.g., notch) can be part of the tapered protrusion or both a part of the tapered recess and the tapered protrusion. It should also be appreciated that alternative embodiment may be configured without these enlarged portions.

In the depicted embodiment the proximal end of the coupling 18 (e.g., adaptor) which is shown threaded to the sonde housing 14 includes a tapered threaded portion configured to engage mating threads of a sonde housing to toque level in excess of 50 foot pounds. As discussed above, the distal end includes a tapered portion between a first unthreaded portion and a second unthreaded portion. The first and second unthreaded portions include a constant maximum cross-sectional dimension. As discussed above, the coupling includes a stop that engages an end face of the first member to prevent full engagement of the threads (i.e., maintains the above define offset). The stop is positioned on a predetermined location on the second unthreaded portion such that it ensures an offset of at least 0.030 inches between the peaks on the threads of the tapered threaded portion with the valleys on threads that the taper threaded portion is configured to engage. In the depicted embodiment the pitch diameter between the threaded portions on the first and second members are offset by at least 0.030 inches.

The present disclosure also provides a method of connecting a drill tool to a drill rod. The method includes the steps of: contacting threads located at a proximate end of a drill tool member with threads located at a distal end of a drill rod member; threading the drill tool member to the drill rod member by relatively rotating the drill rod member and the drill tool member; and aligning structural features on an external surface of the drill tool member with structural features on an external surface of the drill rod member. In the depicted embodiment the step of aligning the structural features includes counter rotating the drill rod assembly relative to the drill tool between one to ninety degrees.

The method further includes the step of sliding a collar over a portion of the drill tool member and drill rod member, wherein the collar is configured to engage the structural features on the external surface of the drill tool member and drill rod member thereby preventing relative rotation between the drill tool member and the drill string member.

In the depicted embodiment the step of threading the drill tool member to the drill rod member simultaneously inserts a boss on the distal end of the drill tool member with an aperture on the drill rod member and inserts a boss on the proximal end of the drill tool member with an aperture on a distal end of the drill rod member. The method also includes the step of maintaining at least 0.030 inch (0.76 millimeters) offset between a peak of the threads located on the proximate end of the drill tool member and a valley of the threads located at a distal end of the drill rod member at least when structural features on the external surface of the drill tool member are aligned with the structural features on the external surface of the drill rod member. In the depicted embodiment the pitch diameter between the threads on the drill tool and mating threads on the drill rod are offset by at least 0.030 inches.

In the depicted embodiment the threading step is accomplished by rotating the drill tool member while holding the drill rod member stationary. It should be appreciated that alternatively the drill rod could be rotated while the drill tool is held stationary. In the depicted embodiment, the threading step includes relatively rotating the drill rod member and drill tool member between one to four full revolutions. In alternative embodiments the threading step may include more or fewer revolutions.

In the depicted embodiment the toque needed to unthread the drill rod assembly from the drill tool assembly is less than 50 foot pounds. The step of threading the drill tool assembly to the drill rod assembly includes rotating the drill tool member until a portion of the drill tool member (e.g., annular shoulder) abuts a portion of the drill rod member (e.g., end face) and limits further rotation. In the depicted embodiment at least 0.030 inches offset is maintained when the portion of the drill tool assembly abuts the portion of the drill string assembly. The at least 0.030 inches offset is maintained even if as much as 50 foot pounds of torque are applied to the connection between the drill rod member and drill tool member during the threading step.

In the depicted embodiment the boss on the distal end of the drill tool includes a maximum cross-sectional dimension that is within 0.0015 to 0.03 inches (0.038-0.76 millimeters) of a maximum cross-sectional dimension of the aperture of the drill rod assembly.

Figure 10:
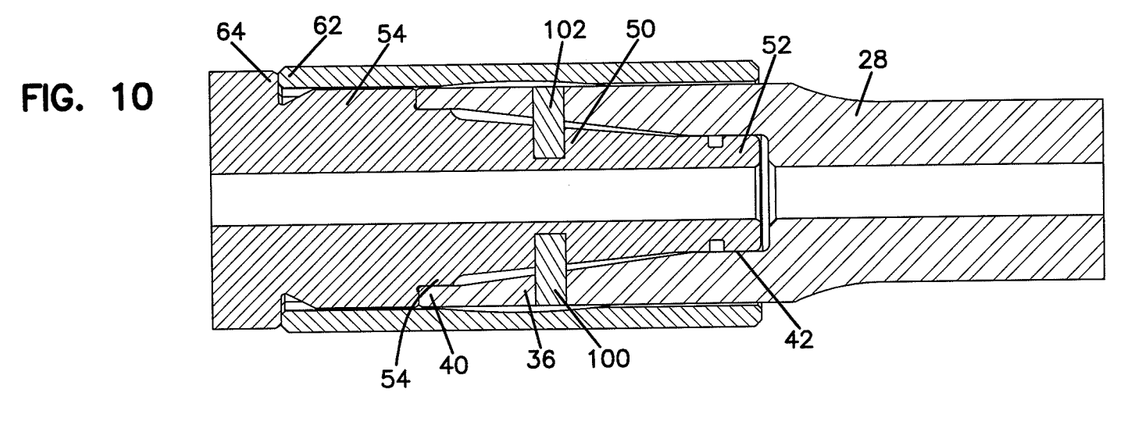
FIG. 10 is a cross-sectional view of an alternative embodiment of the coupling of FIG. 2.

Referring to FIG. 10, an alternative embodiment is shown. The depicted embodiment is similar to the above-described embodiment, however, the threads on the tapered protrusion and aperture are removed. Instead, pins 100, 102 secure the tapered protrusion within the tapered aperture and resist tension forces between the adapter 18 and the starter rod 12. The pins 100, 102 extend through a portion of the distal end 28 of the starter rod and driven end 46 of the adapter 18. The collar 26 slides over the end of the pins and retains them in place.

Figure 11:
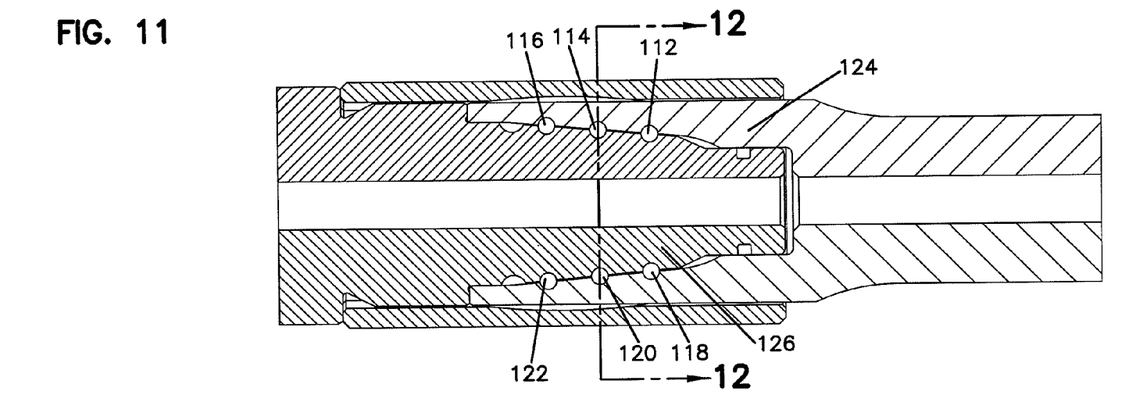
FIG. 11 is a cross-sectional view of an alternative embodiment of the coupling of FIG. 2.
Figure 12:
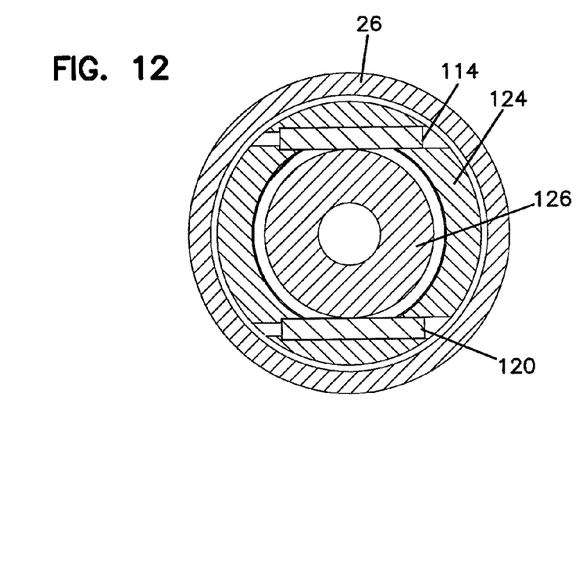
FIG. 12 is a cross-sectional view of the coupling of FIG. 11 along lines 12-12.
Figure 13:
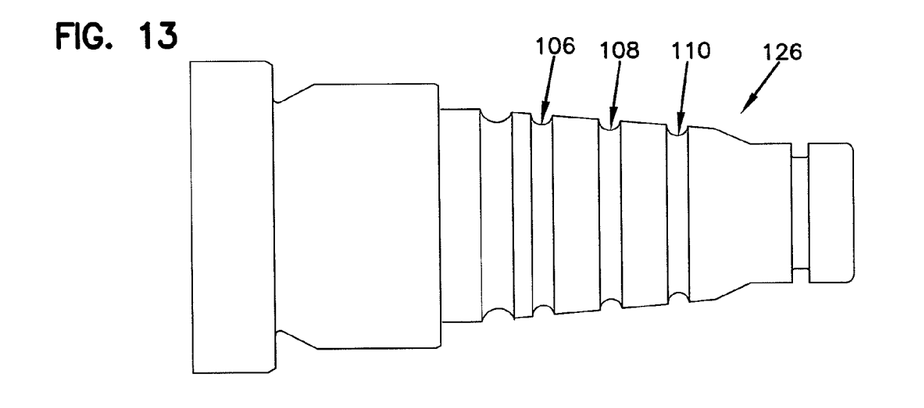
FIG. 13 is a side view of a portion of the coupling of FIG. 11.

Referring to FIGS. 11-13, another alternative embodiment is shown. In the depicted embodiment the tapered aperture 124 and protrusion 126 are not threaded. Instead, the tapered protrusion 126 includes grooves 106, 108, 110 that engage pins 112, 114, 116, 118, 120, 122, which are retain in pin receiving apertures that extend through a portion of the tapered aperture 124. The above described pin configuration secures the tapered aperture 124 to the protrusion 126 against tension forces applied to the connection during operation (e.g., as the drill string is pulled back through the hole). In the depicted embodiment the pins can be removed after removal of the collar 26 via driving a punch through smaller apertures that extend to the back side of the pin receiving apertures. It should be appreciated that although the tapered aperture and protrusion are shown with a gradual taper they could alternative have a stepped profile or the taper could be non-linear.

Figure 14:
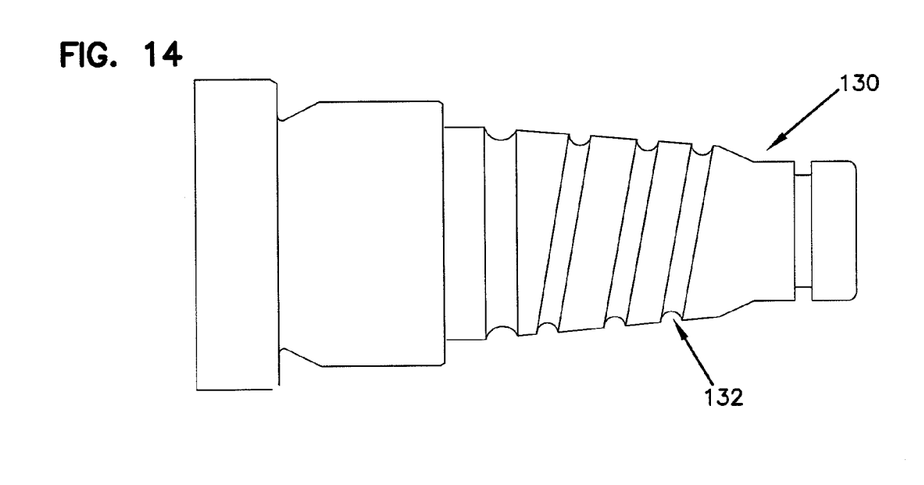
FIG. 14 is a side view of an alternative embodiment of the portion of the coupling shown in FIG. 13.

Referring to FIG. 14, another alternative embodiment is shown. In the depicted embodiment the tapered protrusion 130 includes a spiral groove 132 that is configured to mate with locking pins similar to those shown in FIGS. 11-13, which are retained in pin receiving apertures that extend through a portion of the tapered aperture 124 in a manner to intersect the spiral groove. In this embodiment the groove 131 acts as a single enlarged thread member that secures the tapered aperture and tapered protrusion together. This configuration provides a quick connection and disconnection between the tapered protrusion and tapered aperture. The locking pins that mate with the spiral grooves on the tapered aperture and the receiving apertures in the aperture 124 resist tension forces applied to the connection. The collar 26 prevent the tapered protrusion from rotating relative to the tapered aperture.

It should be appreciate that many more alternative embodiments are possible. For example, although the embodiment shown in FIGS. 10-14 are shown to include annular stress relief zone recess into the tapered protrusion similar to those described above with reference to FIGS. 7 and 8 (portions 66 and 67). Some alternative embodiment do not include stress relieve zones.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of connecting a drill tool to a drill rod member comprising:
    contacting threads located at an end of a drill tool member with threads located at an end of the drill rod member;
    threading the drill tool member to the drill rod member by relatively rotating the drill rod member and the drill tool member, wherein the step of threading the drill tool member to the drill rod member simultaneously inserts a first boss of the drill tool member within a first aperture of the drill rod member and inserts a second boss of the drill tool member within a second aperture of the drill rod member, the second boss being spaced longitudinally away from the first boss;
    aligning a structural feature on an external surface of the drill tool member with a structural feature on an external surface of the drill rod member;
    sliding a collar over a portion of the drill tool member and drill rod member, wherein the collar is configured to engage the structural features on the external surfaces of the drill tool member and drill rod member thereby preventing relative rotation between the drill tool member and the drill rod member;
    wherein the first boss includes a maximum cross-sectional dimension that is between 0.003-0.006 inches (0.076-0.150 millimeters) less than a maximum cross-sectional dimension of the first aperture on the drill rod member and wherein the second boss includes a maximum cross-sectional dimension that is between 0.003-0.006 inches (0.076-0.150 millimeters) less than a maximum cross-sectional dimension of the second aperture of the drill rod member, and
    maintaining at least 0.030 inch (0.76 millimeters) offset in pitch diameter between the threads of the drill rod member and the threads of the drill tool member at least in a state wherein the structural feature on the external surface of the drill tool member is aligned with the structural feature on the external surface of the drill rod member.

2. The method of claim 1, wherein the step of relatively rotating the drill rod member and the drill tool member includes rotating the drill tool member while holding the drill rod member stationary.

3. The method of claim 1, wherein the step of relatively rotating the drill rod member and the drill tool member includes relatively rotating the drill rod member and drill tool member between one to four full revolutions.

4. The method of claim 1, wherein the torque needed to unthread the drill rod assembly from the drill tool assembly is less than 50 foot pounds.

5. The method of claim 1, wherein the step of threading the drill tool member to the drill rod member includes rotating the drill tool member until a portion of the drill tool member abuts a portion of the drill rod member and limits further rotation.

6. The method of claim 5, wherein the step of maintaining at least 0.030 inch (0.76 millimeters) offset in pitch diameter between the threads located on the drill rod member and the threads located on the drill tool member occurs when the portion of the drill tool assembly abuts the portion of the drill string assembly.

7. The method of claim 1, wherein the step of maintaining at least 0.030 inch (0.76 millimeters) offset in pitch diameter between the threads located on the drill rod member and the threads located on the drill tool member occurs even if as much as 50 foot pounds of torque are applied to the connection between the drill rod member and drill tool member during the threading step.

8. The method of claim 1, wherein the step of aligning the structural features includes counter rotating the drill rod assembly relative to the drill tool between one to ninety degrees.

9. An adaptor assembly for connecting a drilling tool to a drill string, the adaptor assembly comprising:
    a first member including a driven end, the driven end:
        comprising:
            a tapered protrusion or recess including threads thereon,
            a first land adjacent a first end of the tapered protrusion or recess,
            a second land adjacent a second end of the tapered protrusion or recess, and
            an external surface with a non-circular cross-section;
    a second member including a drive end, the drive end adapted for connection with the driven end of the first member comprising:
        a tapered recess or protrusion including threads thereon, a third land portion adjacent a distal end of the tapered recess or protrusion, and a fourth land portion adjacent a proximal end of the tapered portion;

wherein the first land engages the fourth land and the second land engages the third land and the threads on the first member engage the threads on the second member, and wherein the first land and the fourth land are cylindrical, each having respective diameters with the respective diameters being within 0.003-0.006 inches (0.076-0.150 millimeters) of each other; and wherein a pitch diameter between the threads on the first member and the threads on the second member is offset by at least 0.030 inches (0.76 millimeters) when the tapered threads on the first member are engaged with the threads on the second member.

10. The adaptor assembly of claim 9, wherein the first member is selected from a group consisting of a drill bit and sonde housing, and wherein the second member includes a pilot drill rod.

11. The adaptor assembly of claim 9, further comprising a collar configured to slide over a portion of the first member and a portion of the second member, the collar being configured to prevent rotation of the first member relative to the second member.

12. The adaptor assembly of claim 9, wherein the threads on the tapered recess and the threads of the tapered protrusions are asymmetric having a tooth width to height ratio between 1.25 to 3.0.

13. The adaptor assembly of claim 9, wherein the first member includes structure that abuts structure on the second member to limit the offset between the peaks of the threads on the tapered recess and valleys of the threads of the tapered protrusions.

14. The adaptor assembly of claim 9, wherein the first, second, third and fourth lands are cylindrical.

15. A coupling configured to connect a sonde housing to a pilot drill rod, the coupling comprising:

a first end portion including a threaded tapered portion positioned between a first unthreaded portion and a second unthreaded portion;

a second end portion opposite the first end portion including a tapered threaded portion configured to engage mating threads of a sonde housing to torque level in excess of 50 foot pounds;

wherein the first unthreaded portion of the first end portion includes a constant maximum cross-sectional dimension;

wherein the second unthreaded portion of the first end portion includes a constant maximum cross-sectional dimension which is larger than the maximum cross-sectional dimensions of the first unthreaded portion; and wherein the maximum cross-sectional dimension of the first unthreaded portion and the second unthreaded portion is predetermined to be at least 0.003 inches (0.076 millimeters) less than the maximum cross-sectional dimension of apertures of the pilot drill rod of which the first and second unthreaded portions are configured to be received within; and wherein the first end portion further comprises a stop that interfaces with the pilot drill rod to ensure at least a 0.030 inch offset in pitch diameter between the tapered threaded portion of the first end portion and a corresponding tapered threaded portion of the pilot drill rod.

16. The coupling of claim 15, wherein the threaded portion of the first end portion includes asymmetric threads having a width to height ratio of between 1.25 to 3.0.

17. The coupling of claim 15, wherein the first and second unthreaded portions are cylindrical in shape.

18. The coupling of claim 15, wherein the stop comprises an annular shoulder having a maximum cross-sectional dimension that is greater than the maximum cross-sectional dimension of the second unthreaded portion.

19. A method of connecting a drill tool member to a drill rod member comprising:

contacting threads of the drill tool member with threads of the drill rod member;

threading the drill tool member to the drill rod member by relatively rotating the drill rod member and the drill tool member;

wherein the step of threading the drill tool member to the drill rod member simultaneously inserts a first boss of the drill rod member within an aperture of the drill tool member and inserts a second boss of the drill rod member within an aperture of the drill tool member and wherein the step of threading the drill tool member to the drill rod member includes the step of maintaining a minimum offset in pitch diameter between the threads of the drill tool member and threads of the drill rod member;

aligning a structural feature on an external surface of the drill tool member with a structural feature on an external surface of the drill rod member;

sliding a collar over a portion of the drill tool member and drill rod member, wherein the collar is configured to engage the structural features on the external surfaces of the drill tool member and drill rod member thereby preventing relative rotation between the drill tool member and the drill string member;

wherein the first boss of the drill rod member and the second boss of the drill rod member include a maximum cross-sectional dimension that is between 0.003-0.006 inches (0.076-0.150 millimeters) less than a maximum cross-sectional dimension of the respective apertures that they are configured to be received in.

20. The method of claim 19, wherein the drill tool member includes a sonde housing.

21. An adaptor assembly for connecting various drilling tools to a drill string, the adaptor assembly comprising:

a starter rod including a driving end and a driven end, the driving end comprising:

a tapered protrusion or recess including threads thereon, a first land adjacent a first end of the tapered protrusion or recess, a second land adjacent a second end of the tapered protrusion or recess, and an external surface with a non-circular cross-section;

a tool adaptor including a drive end and a driven end, the drive end including a threaded connection for attaching to a tool, and the driven end adapted for connection with the driving end of the starter rod comprising:

a tapered recess or protrusion including threads thereon, a third land portion adjacent a first end of the tapered recess or protrusion, and a fourth land portion adjacent a second end of the tapered portion;

wherein the first land is configured to engage the fourth land and the second land is configured to engage the third land;

wherein the first land and the fourth land have maximum cross-sectional dimensions that are within 0.003-0.006 inches (0.076-0.150 millimeters) of each other, and wherein the second land and the third land have maximum cross-sectional dimensions that are within 0.003-0.006 inches (0.076-0.150 millimeters) of each other; and wherein the threads of the tapered protrusion or recess of the starter rod and the threads of the tapered recess or protrusion of the tool adaptor are configured to engage each other with a predetermined minimum offset in pitch diameter.

22. A coupling for transferring torque, tension, thrust and bending forces between a drill string and a drill bit that can be connected and disconnected by an operator using hand tools comprising:

- a first member including a first cylindrical aperture, a second cylindrical aperture, and a tapered internal aperture positioned between the first and second cylindrical apertures, wherein the tapered internal aperture includes internal threads and an annular load distribution notch at a transition between the first cylindrical aperture and the tapered internal aperture;
- a second member including a first cylindrical projection, a second cylindrical projection, and a tapered portion positioned between the first and second cylindrical projections, wherein the tapered portion includes external threads, the second member further comprising a stop, the stop being arranged and configured to engage a corresponding stop of the first member to ensure a predetermined minimum offset in pitch diameter between the internal threads of the first member and the external threads of the second member;
- wherein the first cylindrical projection of the second member is received within the first cylindrical aperture of the first member with a radial clearance configured to transfer at least an amount of bending forces between the first member and the second member; and
- wherein the tapered portion of the second member is received within the tapered internal aperture of the first member and is configured to transfer at least tension forces between the first member and the second member;
- wherein the second cylindrical projection of the second member is received within the second cylindrical aperture of the first member with a radial clearance configured to transfer at least an amount of bending forces between the first member and the second member.

23. The coupling of claim 22, further comprising a collar that slides over at least a portion of the first member and the second member and is configured to transfer at least torque between the first and second member.

24. The coupling of claim 22, wherein at least one of the first and second members includes an annular shoulder that is configured to transfer thrust between the first and second member.

25. The coupling of claim 22, wherein the radial clearance between the first cylindrical projection and first aperture and the second cylindrical projection and second aperture is between 0.038-0.076 millimeters.

26. A coupling for transferring torque, tension, thrust and bending forces between a drill string and a drill bit that can be connected and disconnected by an operator using hand tools comprising:

- a first member including a first cylindrical aperture, a second cylindrical aperture, and an internal aperture positioned between the first and second cylindrical apertures;
- a second member including a first cylindrical projection, second cylindrical projection, and a tapered portion positioned between the first and second cylindrical projections;
- wherein the first cylindrical projection of the second member is received within the first cylindrical aperture of the first member with a radial clearance configured to transfer at least bending forces between the first member and the second member; and
- wherein the tapered portion of the second member is received within the internal aperture of the first member and is configured to transfer at least tension forces between the first member and the second member;
- wherein the second cylindrical projection of the second member is received within the second cylindrical aperture of the first member with a radial clearance configured to transfer at least an amount of bending forces between the first member and the second member; and
- wherein the first member includes threads on the internal aperture and the second member includes threads on the tapered portion, wherein the threads of the internal aperture are configured to loosely engage the threads on the tapered portion as to limit binding of the threads and prevent the transferring of bending forces therebetween.

27. The coupling of claim 26, wherein the projection of the second member is pinned within the internal aperture of the first member.

* * * * *